United States Patent [19]

Shinada

[11] Patent Number: 4,864,363

[45] Date of Patent: Sep. 5, 1989

[54] CLEANING DEVICE FOR A CORONA DISCHARGER

[75] Inventor: Masayuki Shinada, Yokohama, Japan

[73] Assignee: Ricoh Company, Ltd., Tokyo, Japan

[21] Appl. No.: 288,277

[22] Filed: Dec. 22, 1988

[30] Foreign Application Priority Data

| | | | |
|---|---|---|---|
| Dec. 23, 1987 | [JP] | Japan | 62-193945 |
| Dec. 23, 1987 | [JP] | Japan | 62-193946 |
| Dec. 23, 1987 | [JP] | Japan | 62-193947 |
| Oct. 4, 1988 | [JP] | Japan | 63-129565 |

[51] Int. Cl.[4] .............. G03B 00/00

[52] U.S. Cl. .............. 355/133; 355/221; 355/264; 361/230

[58] Field of Search .............. 355/133, 3 CH, 14 CH; 361/229, 230; 250/324–326

[56] References Cited

U.S. PATENT DOCUMENTS 3,840,744 10/1974 Hedman, Jr. .............. 250/325 X 4,788,573 11/1988 Nakaoka et al. .............. 355/3 CH

*Primary Examiner*—L. T. Hix

*Assistant Examiner*—D. Rutledge

*Attorney, Agent, or Firm*—Oblon, Spivak, McClelland, Maier & Neustadt

[57] ABSTRACT

A device for cleaning a corona wire of a corona discharger which is installed in an electrophotographic copier, electrostatic printer or similar electrostatic recorder to play the role of a charger or a discharger. Cleaning members each being provided with a cleaner pad for rubbing against the corona wire are driven by a feed screw and not by a wire and pulley mechanism. The cleaning members brought to a home position are fully spaced apart from the corona wire. When cleaner support members are brought close to any of members which journal the feed screw at opposite ends of the feed screw, they are caused into resilient contact with the journalling member through a coil spring.

7 Claims, 3 Drawing Sheets

F/G. 3
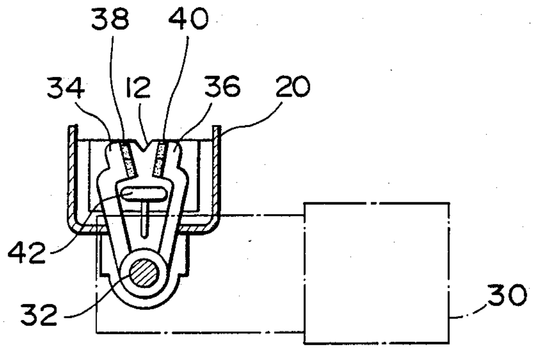
F/G. 4
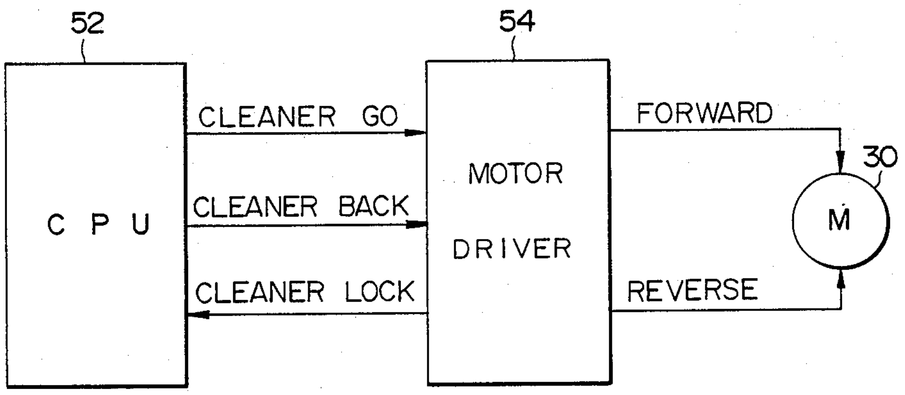

CLEANING DEVICE FOR A CORONA DISCHARGER

BACKGROUND OF THE INVENTION

The present invention relates to a device for cleaning a corona wire of a corona discharger which is installed in an electrophotographic copier, electrostatic printer or similar electrostatic recorder to serve as a charger or discharger.

A charger or a discharger for us in an electrostatic recorder of the kind described for charging a photoconductive element, transferring a toner image, expelling a charge or similar purpose is in many case implemented by a corona discharger. A corona discharge includes a trough-like shield member extending over the entire width of a photoconductive element, dielectric and blocks mounted on opposite ends of the shield member, and a tungsten wire or similar hairline stretched between the end blocks. When a high voltage is applied to the hairline, the hairline produces a corona discharge to thereby charge or discharge the surface of the photoconductive element. Such a hairline is usually referred to as a corona wire.

Various impurities such as particles of dust, toner and paper float in the interior of an electrostatic recorder of the above-described kind. As the recorder repeats its image forming operation, the impurities are sequentially deposited on the corona wire to lower the discharging efficiency and cause an irregular discharge distribution, lowering the quality recording. It has been customary for the corona discharger to be removed from a recorder body and cleaned by a serviceman at certain intervals, at the sacrifice of cost.

An implementation recently proposed to eliminate the above problem is a cleaning member which is movable along the corona wire and is moved along the latter periodically to remove toner, paper dust and other impurities. Such a cleaning member is retained by an exclusive support member which is in many cases driven by a drive wire and pulleys. However, since ozone is produced in the corona discharger due to corona discharges and since the temperature inside a copier is high due to various kinds of heat sources, the drive wire and pulleys are easy to deteriorate and/or to deform (e.g. elongation of the belt) and fail in a short period of time. With this kind of cleaning member, therefore, it is impossible to clean the corona discharger with stability.

SUMMARY OF THE INVENTION

It is therefore an object of the present invention to provide a reliable cleaning device for a corona discharger used with an electrostatic recorder which is operable with stability over a long period of time.

It is another object of the present invention to provide a generally improved cleaning device for a corona discharger.

A device for cleaning a corona wire of a corona discharger having a trough-like shield member which is formed with an open portion in a lengthwise direction of the shield member, end block members each being provided at a respective end of the shield member, and the corona wire stretched between the end block members of the present invention comprises an elongate slot having a predetermined width formed through a bottom wall of the shield member opposite to the open portion and in a lengthwise direction of the shield member over a predetermined length, a drive member located outside of the slot and rotatably supported at opposite ends by the end block members, and a pair of cleaner pad support members protruding into the shield member through the slot and individually provided at free ends with cleaner pads which pressingly contact with the corona wire from opposite sides to each other, the cleaner pad support members being connected to and driven by the drive member in a reciprocating motion in the lengthwise direction. The corona wire exerts a resilient repulsive force on the cleaner pad support members through the cleaner pads which are individually supported by the cleaner support members so that the cleaner pad support members are each maintained in an upright position in abutment against a respective edge of the slot, the cleaner pads being moved in a reciprocating motion while pressing the corona wire in opposite directions to each other out of a position of the corona wire which is stretched under ordinary tension, whereby the corona wire is cleaned.

BRIEF DESCRIPTION OF THE DRAWINGS

The above and other objects, features and advantages of the present invention will become more apparent from the following detailed description taken with the accompanying drawings in which:

FIG. 3 is a cross-section of the corona discharger shown in FIG. 1; and

FIG. 4 is a schematic block diagram showing a control circuit associated with a drive motor.

DESCRIPTION OF THE PREFERRED EMBODIMENT

Figure 1:
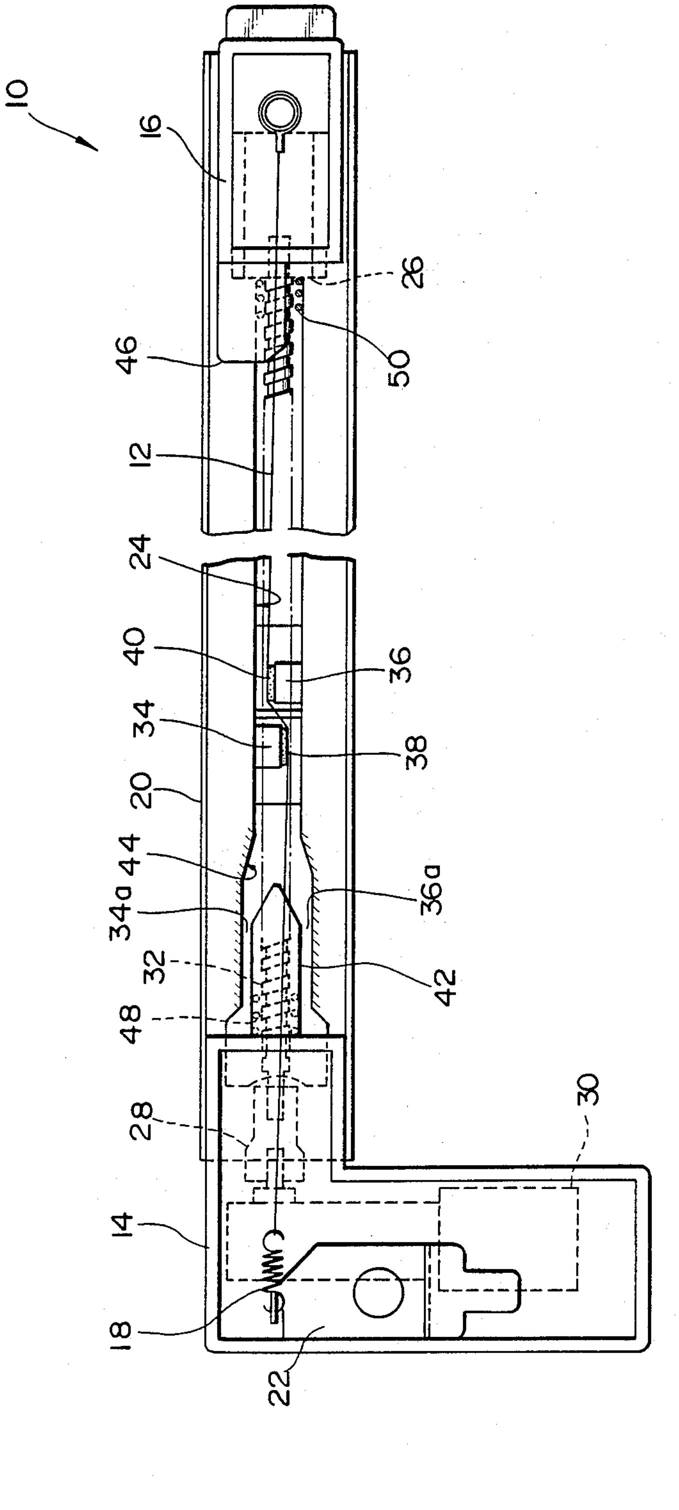
FIG. 1 is a plan view of a corona discharger to which the present invention is applied.
Figure 2:
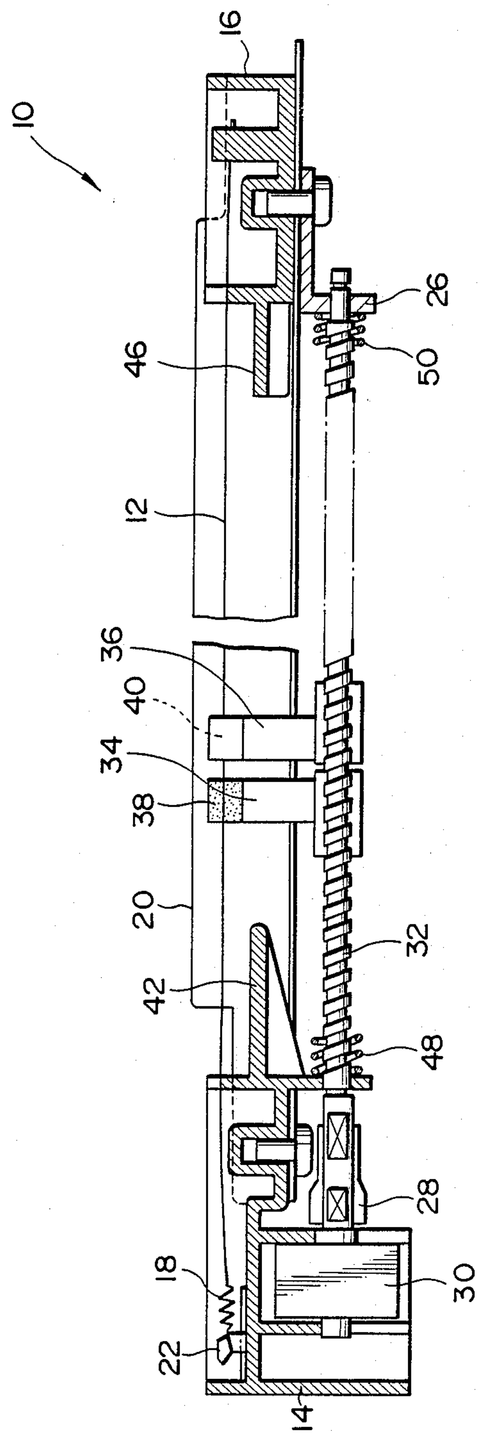
FIG. 2 is a sectional side elevation of the corona discharger shown in FIG. 1.

Referring to FIGS. 1 to 3 of the drawings, a corona discharger to which a preferred embodiment of the present invention is applied is shown and generally designated by the reference numeral 10. In the figure, a corona wire 12 is implemented by a hairline made of tungsten, for example, and stretched between dielectric end blocks 14 and 16 which are located at opposite ends of the discharger 10. A spring 18 is provided for maintaining the corona wire 12 under predetermined tension. A shield case 20 formed from sheet metal and provided with a cross-section generally in the form of a letter U surrounds the corona wire 12. When a high voltage is applied to the corona wire 12, the wire 12 produces a corona discharge to charge or discharge a photoconductive element (not shown) which is located to face an open side of the U-shaped shield case 20. The configuration described so far is substantially identical with a prior art corona discharger.

In the illustrative embodiment, a wall of the shield case 20 which faces the open side of the shield case 20 is provided with a slot 24 over substantially the entire length of the discharger 10. A bearing 26 is mounted on the end block 16. A feed screw 32 formed with a male screw-thread extends outside of the slot 24 in the lengthwise direction of the corona discharger 10. The feed screw 32 is rotatably supported at its opposite ends by the end block 14 and the bearing 26 and driven in a reversible rotary motion by a drive motor 30 through a coupling 28. A pair of cleaner support members 34 and 36 are mounted side by side on the feed screw 32 and each is provided with a female screw-thread which mates with the male screw-thread of the feed screw 32. The cleaner support members 34 and 36 protrude into the shield case 20 through the slot 24. Cleaning members in the form of cleaner pads 38 and 40 are fitted on the tips of the cleaner support members 34 and 36, respectively. The cleaner support members 34 and 36 are configured and positioned such that their cleaner pads 38 and 40 individually make contact with the corona wire 12 from opposite sides with respect to the corona wire 12. More specifically, the cleaner support members 34 and 36 are positioned such that their surfaces opposite to the cleaner pads 38 and 40 each abuts against a respective edge of the slot 24 while their other or cleaner pad carrying surfaces urge the corona wire 12 away from the support members 34 and 36. Stated another way, the cleaner support members 34 and 36 are restricted in position by the resilient repulsive force of the corona wire 12 with their back abutting against the opposite edges of the slot 24, and the cleaner pads 38 and 40 are oriented in such a manner as to face each other and to slightly overlap each other in a direction perpendicular to the corona wire 12.

A projection 42 extends from the inner end of the end block 14 and has a tip which is tapered at an acute angle and symmetrically with respect to the center line thereof. A notch 44 is formed in the shield case 20 and contiguous with but wider than the slot 24. As seen in a plan, the edges of the notch 44 are spaced apart from the edges of the projection 42 by a distance which allows the cleaner support members 34 and 36 to move therethrough. Labeled 34*a* and 36*a* are the home positions of the cleaner support members 34 and 36 when they contact with the end block 14. In the home positions 34*a* and 36*a*, the cleaner support members 34 and 36 are individually restricted by the edges of the notch 44 and those of the projection 42, so that their associated cleaner pads 38 and 40 are spaced apart from the corona wire 12. In this condition, the corona wire 12 is maintained straight on and along the center line of the shield case 20.

A projection 46 extends from the inner end of the other end block 16. When the cleaner support members 34 and 36 are brought to a stop at the opposite side to the home positions 34*a* and 36*a*, the projection 46 serves to prevent them from rotating about the axis of the feed screw 32. Coil springs 48 and 50 are individually located at opposite ends of the feed screw 32 in contact with the end blocks 14 and 16, while each surrounding the feed screw 32.

The cleaner support members 34 and 36 are usually maintained in the home positions, or standby positions, 34*a* and 36*a* where they contact with the end block 14. In this condition, the cleaner support members 34 and 36 are restricted in position by the edges of the notch 44 and the edges of the projection 42, so that their associated cleaner pads 38 and 40 are spaced apart from the corona wire 12. The corona wire 12 is therefore accurately maintained on the center line of the shield case 20 to effect accurate charging or discharging as needed.

When the motor 30 shown in FIG. 1 is rotated in the forward direction to clean the corona wire 12, the feed screw 32 is rotated in the forward direction via the coupling 28 with the result that the cleaner support members 34 and 36 which are held in threaded engagement with the feed screw 32 begin to move toward the end block 16 away from the home positions 34*a* and 36*a*. As the cleaner support members 34 and 36 enter the slot 24 into which the notch 44 merges, they are brought into pressing contact with the corona wire 12 by being restricted by the edges of the slot 24 which is narrower than the notch 44 and the feed screw 32. Then, the two cleaner pads 38 and 40 cross each other and strongly rub against the corona wire 12 to remove toner, paper dust and other impurities from the corona wire 12. As soon as the cleaner support members 34 and 36 reach a position where they contact with the bearing 26 which is mounted on the other end block 16, the rotation of the motor 30 is reversed. Consequently, the cleaner support members 34 and 36 are moved toward the end block 14 away from the end block 16, thereby repeating the cleaning action. When the cleaner support members 34 and 36 approach their home positions 34*a* and 36*a*, they are urged away from the corona wire 12 by the projection 42 of the end block 14 and the notch 44 of the shield case 20. The motor 30 is deenergized at the instant when the cleaner support members 34 and 36 reach the home positions 34*a* and 36*a*.

One cycle of operations of the drive motor 30, i.e., the timing for reversing the motor 30 upon the arrival of the cleaner support members 34 and 36 at the end block 16 and the timing for deenergizing the motor 30 upon the return of the members 34 and 36 to the home positions 34*a* and 36*a* may be governed by using a timer. Alternatively, the reversal and/or the subsequent stop of the motor 30 may be effected by sensing an overcurrent which flows when the cleaner support members 34 and 36 abut against the bearing 26 or the end block 14 due to the resulting increase in the load acting on the motor 30.

Referring to FIG. 4, a specific construction of a control circuit associated with the motor 30 is schematically shown. When a signal CLEANER GO fed from a central processing unit (CPU) 52 to a motor driver 54 turns into a high level, the motor driver 54 drives the motor 30 in the forward direction. This moves the cleaner support members 34 and 36 to the right as seen in FIGS. 1 and 2 until they abut against the bearing 26 which is rigid on the end block 16. In response to the resulting overcurrent, the level of a signal CLEANER LOCK fed from the motor driver 54 to the CPU 52 turns from low to high to inform the latter of the abutment of the cleaner support members 34 and 36 against the bearing 26. Then, the signal CLEANER GO is turned to a low level. Subsequently, a signal CLEANER BACK is turned from a low level to a high level to reverse the motor 30 via the motor driver 54, whereby the cleaner support members 34 and 36 are moved backward toward the end block 14. When the cleaner support members 34 and 36 abut against the end block 14, an overcurrent flows again so that the signal CLEANER LOCK is charged from a low level to a high level to inform the CPU 52 of the return of th members 34 and 36 to the home positions 34*a* and 36*a*. Then, the signal CLEANER BACK is turned into a low level to stop the cleaner support members 34 and 36 at the home positions 34*a* and 36*a*. Although the feed screw 32 may rotate even after the cleaner support members 34 and 36 have abutted against the end block 14 or the bearing 26, the feed screw 32 and the female screw-threads of the members 34 and 36 are preventing from being locked to each other by the coil springs 48 and 50 which are located at opposite ends of the feed screw 32.

In summary, it will be seen that the present invention provides a cleaning device which cleans a corona wire of a corona dicharger with stability and reliability because its driving member is free from corrosion and deformation otherwise caused by heat which is generated within an electrostatic recorder and ozone developed by the discharger. Cleaner support members are prevented from being locked at opposite ends of a feed screw on which the cleaner support members are mounted. Further, the cleaning device allows the discharger to exhibit its charging or discharging function stably all the time.

Various modifications will become possible for those skilled in the art after receiving the teachings of the present disclosure without departing from the scope thereof.

What is claimed is:

1. A device for cleaning a coron wire of a corona discharger having a trough-like shield member which is formed with an open portion in a lengthwise direction of said shield member, end block members each being provided at a respective end of said shield member, and said corona wire stretched between said end block members, said device comprising:

an elongate slot having a predetermined width formed through a bottom wall of said shield member opposite to said open portion and in a lengthwise direction of said shield member over a predetermined length;

a drive member located outside of said slot and rotatably supported at opposite ends by said end block members; and a pair of cleaner pad support members protruding into said shield member through said slot and individually provided at free ends with cleaner pads which pressingly contact with said corona wire from opposite sides to each other, said cleaner pad support members being connected to and driven by said drive member in a reciprocating motion in the lengthwise direction;

said corona wire exerting a resilient repulsive force on said cleaner pad support members through said cleaner pads which are individually supported by said cleaner support members so that said cleaner pad support members are each maintained in an upright position in abutment against a respective edge of said slot, said cleaner pads being moved in a reciprocating motion while pressing said corona wire in opposite directions to each other out of a position of said corona wire which is stretched under ordinary tension, whereby said corona wire is cleaned.

2. A device as claimed in claim 1, wherein said drive member comprises a feed screw having a male screw-thread.

3. A device as claimed in claim 2, wherein said cleaner pad support members each comprises a female screw-thread mating with said male screw-thread of said feed screw.

4. A device as claimed in claim 3, further comprising:

journalling members provided at opposite end portions of a movable range of said cleaner pad support members for rotatably supporting said feed screw; and resilient members provided at sides of said journalling members which face said respective cleaner pad support members, said cleaner pad support members being brought into resilient contact with said cleaner pad support members through said resilient members.

5. A device as claimed in claim 1, wherein said cleaner pad support members have a home position which is defined at one end portion of said shield member adjacent to one of said end block members.

6. A device as claimed in claim 5, wherein the width of said slot is increased in said end portion of said shield member where said home position is defined.

7. A device as claimed in claim 6, wherein said one end block comprises a projection having a tapered tip and protruding to between opposite edges of a portion of said slot having an increased width, said cleaner pad support members being positioned in said home position by the edges of said portion of said slot having the increased width and edges of said projection such that said cleaner pads are spaced apart from said corona wire.

* * * * *